US006318123B1

(12) United States Patent
Edlinger

(10) Patent No.: US 6,318,123 B1
(45) Date of Patent: Nov. 20, 2001

(54) METHOD FOR GRANULATING A LIQUID SLAG BATH AND DEVICE FOR CARRYING OUT THE METHOD

(75) Inventor: Alfred Edlinger, Baden (CH)

(73) Assignee: "Holderbank"Financiere Glarus AG, Glarus (CH)

( * ) Notice: Subject to any disclaimer, the term of this patent is extended or adjusted under 35 U.S.C. 154(b) by 0 days.

(21) Appl. No.: 09/601,367

(22) PCT Filed: Dec. 1, 1999

(86) PCT No.: PCT/AT99/00292

§ 371 Date: Aug. 1, 2000

§ 102(e) Date: Aug. 1, 2000

(87) PCT Pub. No.: WO00/32306

PCT Pub. Date: Jun. 8, 2000

(30) Foreign Application Priority Data

Dec. 1, 1998 (AT) .................................................... 2029/98
Mar. 23, 1999 (AT) .................................................... 543/99

(51) Int. Cl.[7] ................................ C04B 5/02; C04B 5/06

(52) U.S. Cl. .................................. 65/19; 65/20; 65/21.1; 65/141; 65/142; 65/128; 65/130; 65/329; 65/330; 588/251; 266/201; 241/16; 241/38; 425/7

(58) Field of Search ................................ 65/19, 20, 21.1, 65/376, 141, 128, 130, 329, 330, 142; 588/251; 266/201; 241/38, 16; 425/7

(56) References Cited

U.S. PATENT DOCUMENTS 2,093,374 * 9/1937 Wadsworth ............................ 65/329
2,093,375 * 9/1937 Wadsworth ............................ 65/329
4,046,541 * 9/1977 Anderson ................................ 65/19
4,253,862 * 3/1981 Kobayashi .............................. 65/330
4,350,326 * 9/1982 Fujii et al. ............................. 65/19
4,886,539 * 12/1989 Gerutti et al. ......................... 65/20

FOREIGN PATENT DOCUMENTS 40 32 518 1/1992 (DE) .
196 32 698 2/1998 (DE) .
2 284 677 4/1976 (FR) .
47-604 * 1/1972 (JP) ........................................ 65/19
WO 95/15402 6/1995 (WO) .

* cited by examiner

*Primary Examiner*—Michael Colaianni
(74) *Attorney, Agent, or Firm*—Kevin E. Joyce

(57) ABSTRACT

The method for granulating liquid slag melts, in particular blast furnace slag, in which the melt (2) is ejected into a cooling chamber via a slag tundish (1) and in which fluid under pressure, in particular compressed gas, vapor or pressurized water, is injected in the direction of the slag exit (6) in order to eject said liquid slag, is characterized in that the pressure fluid jet discharges into a throttle pipe (3) which is immersed in the slag bath and whose lower edge is mounted so as to be adjustable in the height direction (4). The corresponding device comprises a lance (7) which is surrounded by a height-adjustable throttle pipe (3) whose lower edge (5) is immersed in the slag bath (2) contained in the tundish (1) and forms a throttling cross section between the slag exit (6) and the slag bath (2).

12 Claims, 2 Drawing Sheets

METHOD FOR GRANULATING A LIQUID SLAG BATH AND DEVICE FOR CARRYING OUT THE METHOD

This application is 371 the national phase of international application PCT/AT99/00292 filed Dec. 1, 1999 which designated the U.S.

BACKGROUND OF THE INVENTION

1. Field of the Invention

The invention relates to a method for granulating liquid slag melts, in particular blast furnace slag, wherein the melt is ejected into a cooling chamber via a slag tundish and wherein fluid under pressure, in particular compressed gas, vapor or pressurized water, is injected in the direction of the slag exit in order to eject said liquid slag, as well as a device for carrying out this method.

2. Prior Art

In order to granulate and disintegrate molten slags, it has already been proposed to eject the same into granulation spaces by the aid of vapor or a propellant with further comminution subsequently being effected also in jet mills using propellant jets. Based on slag temperatures of between 1400° and 1600° C., the relatively large temperature difference between the propellant gas stream and the molten slag involves the risk of the formation of more or less large agglomerates as well as the danger of thread formation, which will consequently increase the comminution work and considerably reduce the cooling rate. The proposals made so far were primarily based on the object to accomplish the cooling of the molten slags as rapidly as possible, such proposals having, of course, been impaired by the formation of agglomerates and threads.

According to another unpublished proposal made by the Applicant, the liquid slag was ejected into the granulation space by the aid of combustion offgases in order to reduce the danger of the slag exit opening from the slag tundish to be obstructed by solidifying slag. By such a mode of procedure, the slag particles injected into the granulation space get into a consecutively arranged cooling zone at substantially higher temperatures, which higher temperatures bring about a reduced slag viscosity and a reduced surface tension of the slag droplets such that a finer division of the slag droplets is being obtained as the latter enter the cooling zone. The fine dispersion of slag droplets results in accordingly small droplets having relatively high specific surfaces such that cooling may be achieved in smaller-structured cooling chambers. Yet, the installation of burners in the region of the slag spout of the tundish involves high structural and apparative expenses.

SUMMARY OF THE INVENTION

The invention aims to further reduce, and render adjustable to the respective requirements within wide limits, the particle size of the ejected dispersion when using fluid under pressure for ejecting liquid slags from a slag tundish into a consecutively arranged granulation chamber in which cooling takes place as well. In particular, the invention aims to form such fine-particle slag droplets which, as a result, render feasible to obviate the injection of water as a whole and to effect cooling exclusively by radiation cooling means. To solve this object, the mode of procedure according to the invention essentially consists in that the pressure fluid jet discharges into a throttle pipe which is immersed in the slag bath and whose lower edge is mounted so as to be adjustable in the height direction. By the pressure fluid jet discharging into a throttle pipe which is immersed in the slag bath and whose lower edge is mounted so as to be adjustable in the height direction, it has become feasible to impart on the molten slag streaming in from the slag tundish the form of a thin-walled jacket of a slag jet, wherein the wall thickness of such a tubular slag jet may be substantially influenced by varying the height adjustment of the lower edge of the throttle pipe. Due to the fact that, as a rule, a pressure fluid jet of the appropriate temperature, for instance, formed by hot combustion offgases, compressed gas, vapor or pressurized water is coaxially directed into the axis of this tubular slag jet, particularly fine divisions and dispersions may be provided with particle sizes of below 10 $\mu$m being obtainable. Such fine particles, as a result, will yield microgranulates having a grain size distribution of 10 to 500 $\mu$m, wherein, due to the particularly fine division, it will usually do to exclusively use radiation coolers for solidifying the droplets.

According to a preferred mode of procedure, the throttle pipe space surrounding the pressure fluid jet discharge may be kept under a negative pressure. By that measure an even finer division may be achieved, whereby a pulsating jet may be obtained, in particular, if the supply of ambient air from the throttle pipe entrained by the propellant jet, in turn, is accordingly throttled itself. By appropriately tuning the pressure ratios in the space surrounding the fluid jet and adjusting the height of the lower edge of the throttle pipe accordingly, a controlled oscillation procedure may be triggered with a small amount of air each being sucked in, thus causing oscillation pulses to be generated in the space surrounding the mouth of the fluid jet, which is configured as a negative-pressure chamber. Therefore, pulses are imparted on the slag jet for the formation of droplets with periodic pressure impacts being superimposed, leading to a further comminution of the droplets. The pulse frequency may be tuned to the slag viscosity and the surface tension, wherein said pulse frequency may be influenced by the length of the throttle pipe, the speed of the propellant, the air flow rate, the pressure difference between the negative-pressure chamber and the counter pressure established within the granulation space, the rheology of the slag and, in particular, the surface tension as well as the temperature of the propellant and the choice of the propellant. By suitably selecting these parameters even ultrasonic vibrations aimed at a superfine disintegration with droplet sizes of less than 1 $\mu$m may be formed. To this end, the method advantageously is carried out in a manner that the amount of air sucked into the hollow space of the throttle pipe is dimensioned for the formation of oscillation pulses, wherein, preferably, gas or hot gas is fed to the lance under a pressure of 3 to 7 bars.

The device according to the invention for granulating liquid slag melts, in particular blast furnace slag, in which the melt is ejected into a cooling chamber via a slag tundish and in which fluid under pressure, in particular compressed gas, vapor or pressurized water, is applied or introduced by means of a lance in the direction of the slag exit in order to eject said liquid slag, is essentially characterized in that the lance is surrounded by a height-adjustable throttle pipe whose lower edge is immersed in the slag bath contained in the tundish and forms a throttling cross section between the slag exit and the slag bath. By employing a height-adjustable throttle pipe it is feasible, as mentioned in the beginning, to adapt to the respective requirements the wall thickness of the tubular slag jet formed. In order to induce suitable resonance processes as well as oscillations overlaying said ejection, the configuration advantageously is devised such that the throttle pipe is designed to be closed on its side facing away from the slag bath and is connected with a gas duct, in particular an air duct, via an adjustable and closeable throttle valve. Depending on the position of that throttle valve, a more or less small negative pressure will be maintained within the throttle pipe, wherein the configuration advantageously is devised such that the throttle pipe is designed as a resonance pipe whose length and whose throttling cross section are dimensioned for the sucking in of air aimed at the generation of ultrasonic vibrations.

On account of the extremely small slag droplets obtainable in this manner it may consequently do to exclusively use radiation coolers, the configuration preferably being devised such that at least one radiation cooler and a discharging sluice for granulates are connected to the exit opening of the slag tundish.

A particularly intensive and small-structured granulation chamber in that case is essentially configured in a manner that a first radiation cooler is designed as a high-pressure radiation steam boiler for a feed water pressure ranging between 10 and 220 bars at temperatures of between 200° and 500° C., wherein preferably a consecutive second radiation cooler is configured as a convection steam boiler. Due to the high thermal flow density, supercritical vapor may be produced as well.

BRIEF DESCRIPTION OF THE DRAWINGS

In the following, the invention will be explained in more detail by way of an exemplary embodiment schematically illustrated in the drawing. In the drawing.

DETAILED DESCRIPTION OF PREFERRED EMBODIMENTS OF THE INVENTION

Figure 1:
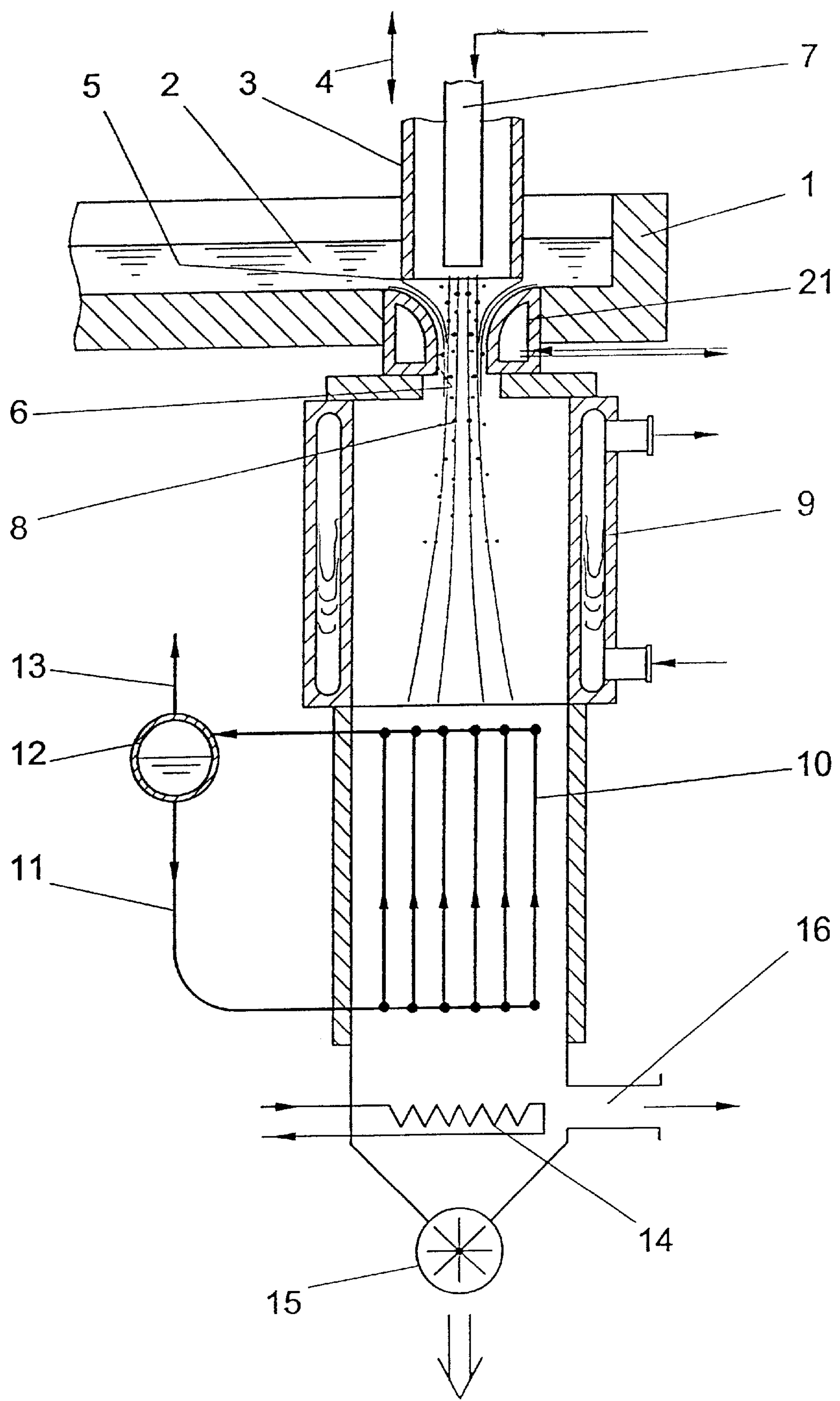
FIG. 1 illustrates a first embodiment of a device according to the invention and FIG. 2 depicts a modified detail of the configuration of the throttle pipe for generating oscillation pulses.

From FIG. 1, a slag tundish 1 is apparent, in which molten slag 2 is maintained at a suitable temperature. The temperature of the slag bath may be as high as 1600° C. Immersed in the slag bath is a throttle pipe 3 which is adjustable in height in the direction of the double arrow 4 such that a throttling gap will remain between the lower edge 5 and the slag exit opening 6, via which gap a tubular slag jet is formed.

Into the interior of the throttle pipe 3 runs a gas lance 7, via which fluid may be injected. Preferably, a hot gas having a pressure of 5 to 10 bars and a temperature of more than 1000° C. is injected in an amount of from 50 to 600 kg hot gas per ton of slag. Such a hot gas may be produced in a pressure-charged combustion chamber.

The slag exit opening 6 is designed as a cooled annular chamber 21, through which cooling water flows.

The extremely fine slag droplets 8 ejected in that manner after this get into a radiation cooler, a first partial region of which radiation cooler is designed as a radiation steam boiler and denoted by 9. High-pressure feed water is supplied to the radiation steam boiler at a pressure of 10 to 220 bars and forced through the cooling chambers, whereby high-pressure vapor may be drawn off, for instance at temperatures of between 200 and 400° C. and a pressure of between 10 and 220 bars. On the lower end of this first radiation steam boiler 9, the particles have temperatures of around 600° C. so that further cooling may subsequently be effected in a convection steam boiler 10. Such a convection steam boiler may be operated by natural circulation via a downpipe 11, wherein a vapor drum 12 is provided, from which saturated steam is drawn off via a duct 13. On the lower end of the granulating space, combustion air as is required for the production of hot gas may be preheated by means of a heat exchanger 14. Microgranulates having an average grain size distribution of between 10 and 360 $\mu$m may be drawn off via a sluice 15, wherein largely cooled offgas may be drawn off through the connection 16 at temperatures of approximately 200° C.

Figure 2:
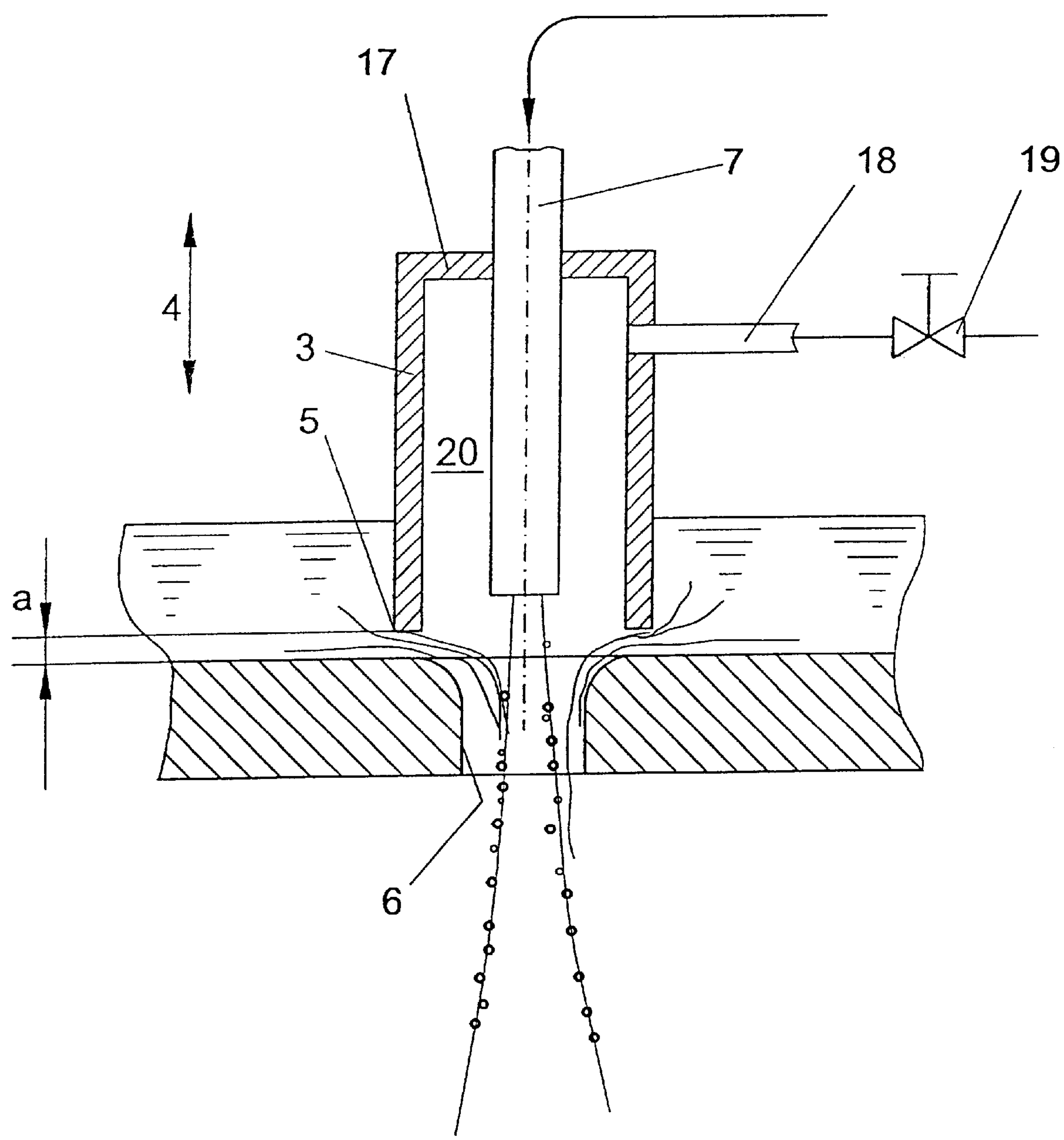

The particle sizes of the microgranulates even may be further comminuted by rendering the division of the slag droplets even more effective. Such a modified configuration is schematically elucidated in FIG. 2. There, the throttle pipe 3 comprises a bottom 17 terminating the pipe, through which bottom the gas or hot gas lance 7 passes in a tight manner. Thus, a lance-surrounding space is created, to which air may be supplied in a controlled manner through a duct 18 and a throttle valve 19 so as to cause an appropriate negative pressure to build up within that space 20. By the distance a between the lower edge 5 and the slag exit 6, which is variable by appopriate adjustment of the height position in the sense of the double arrow 4, the wall thickness of the tubular slag jet may be adjusted with an appropriate counter pressure being built up in the consecutive cooler. The slag melt is seized by pressure medium at temperatures of between 1300° and 1600° C., wherein pressure impacts or pulses that may be in the ultrasonic range will be obtained by adjustment of the respective negative pressure within the chamber 20. In that manner, slag droplets having diameters of 1 $\mu$m may be realized.

What is claimed is:

1. A method for granulating liquid slag, wherein the slag is ejected into a cooling chamber from a slag tundish through a slag exit under the influence of fluid injected as a pressurized fluid jet into the slag in a direction which urges the slag through said exit, said fluid jet being discharged from within a throttle pipe immersed in the slag and arranged coaxially with the slag exit to produce a tubular slag jet ejected through the slag exit into the cooling chamber, said throttle pipe being height adjustable to vary the distance between a lower edge of the throttle pipe and said exit.

2. A method according to claim 1, wherein a space between said fluid jet and said throttle pipe is maintained under negative pressure.

3. A method according to claim 1 or 2, wherein said pressurized fluid jet is formed by a gas fed to a lance positioned within the throttle pipe and spaced therefrom, said gas being pressurized within a range of 3 to 7 bars.

4. A method according to claim 2, wherein said space between the fluid jet and said throttle pipe is hollow and is dimensioned such that air sucked into the hollow space via a passage through the pipe is formed into oscillation pulses.

5. A method according to claim 4, wherein said pressurized fluid jet is formed by a gas fed to a lance positioned within the throttle pipe and spaced therefrom, said gas being pressurized within a range of 3 to 7 bars.

6. A device for granulating liquid slag, comprising:

a slag tundish for containing said slag, said tundish including an exit to permit passage of the slag to a cooling chamber;

a throttle pipe immersed in the slag within the tundish, said throttle pipe being arranged coaxially with the slag exit and being height adjustable to vary the distance between a lower edge of the throttle pipe and said slag exit thereby forming a variable cross-section between the throttle pipe and the slag exit; and a lance positioned within the throttle pipe for injecting a pressurized fluid jet into the slag in a direction which urges the slag through said exit.

7. A device according to claim 6, wherein said throttle pipe is closed at an end thereof opposite said lower edge and wherein the throttle pipe is provided with a hollow interior space between the lance and the throttle pipe which is connected to an air duct via a throttle valve.

8. A device according to claim 7, wherein said throttle pipe has a length which, when coupled with said variable cross-section and sucking in of air via the air duct, generates ultrasonic vibrations in said fluid jet.

9. A device according to any one of claims 6, 7 to 8, wherein said cooling chamber includes at least one radiation cooler and wherein a sluice is connected to the cooling chamber for discharging slag granulates from said chamber.

10. A device according to claim 9, wherein said radiation cooler comprises a high-pressure radiation steam boiler having a feed water pressure ranging between 10 and 220 bars and a vapor pressure of between 10 and 220 bars at temperatures between 200° and 400° C.

11. A device according to claim 9, further comprising a second radiation cooler configured as a convection steam boiler.

12. A device according to claim 10, further comprising a second radiation cooler configured as a convection steam boiler.

* * * * *